July 31, 1973 R. C. MOSIER 3,749,602
METHOD OF REMOVING HIGH-TEMPERATURE ENAMEL INSULATION
FROM ELECTRICALLY CONDUCTIVE WIRE
Original Filed Nov. 25, 1970 2 Sheets-Sheet 1

INVENTOR
Richard C. Mosier
BY *Allard A. Bradlock*

ATTORNEYS

United States Patent Office 3,749,602
Patented July 31, 1973

3,749,602
METHOD OF REMOVING HIGH-TEMPERATURE ENAMEL INSULATION FROM ELECTRICALLY CONDUCTIVE WIRE
Richard C. Mosier, Grabill, Ind., assignor to General Electric Company
Original application Nov. 25, 1970, Ser. No. 92,561, now abandoned. Divided and this application May 24, 1972, Ser. No. 256,600
Int. Cl. B08b 7/00; B21f 21/00
U.S. Cl. 134—19                   9 Claims

ABSTRACT OF THE DISCLOSURE

A method of removing high-temperature enamel insulation such as esterimide and polyimide from electrically conductive wire. The method comprises the steps of heating the high-temperature enamel insulation to be removed to red heat as by use of a gas-oxygen torch whereupon the heated insulation is degraded to a weakly cohesive state. A stream of coolant such as a mixture of air and water is then directed at the heated insulation to cool and blow the heated insulation from the wire.

CROSS-REFERENCE TO RELATED APPLICATION

This is a division of application Ser. No. 92,561, filed Nov. 25, 1970, now abandoned.

BACKGROUND OF THE INVENTION

Vinyl acetal and polyester type wire enamels have created few problems in removal by heat and subsequent wire joining by fusion due to the rapid and effective degradation of the coatings in a gas-oxygen flame and resultant relatively contaminant-free wire surface. However, esterimide, polyimide, and other high-temperature enamels degrade at much higher temperatures than the vinyl acetal and polyester wire enamels. When a gas-oxygen flame is used to remove such high-temperature insulation, it is necessary to maintain the flame in contact with the insulation for too long a period of time with the result that a char is formed which bonds tenaciously to the conductor and cannot be removed by further heating.

Machanical removal of high-temperature insulation is used but it is not a desirable production method because of the high cost involved and the quality problems associated with nicked and broken wires. The present invention can be better understood if the procedure for joining conductors insulated with lower-temperature materials such as vinyl acetal is kept in mind. This procedure is:

(1) Twist together the number of unstripped wires to be joined.
(2) Trim to proper length by heating with gas-oxygen torch.
(3) Heat twisted area with torch flame to remove insulation.
(4) Join wires by fusing with torch flame.
(5) Add brazing alloy.

SUMMARY OF THE INVENTION

The method of the present invention differs from the five steps described above in that higher temperatures must be obtained in order to degrade or decompose the high-temperature insulating materials and a rapid stream of coolant which can be air or an inert gas such as carbon dioxide, argon, nitrogen or helium, is employed to remove decomposed insulation from the joint and prevent premature melting of the conductors. It is desirable that the coolant include water particles as such particles facilitate the sloughing off of insulation after the application of heat has weakened the cohesiveness of the insulation.

Figure 1:
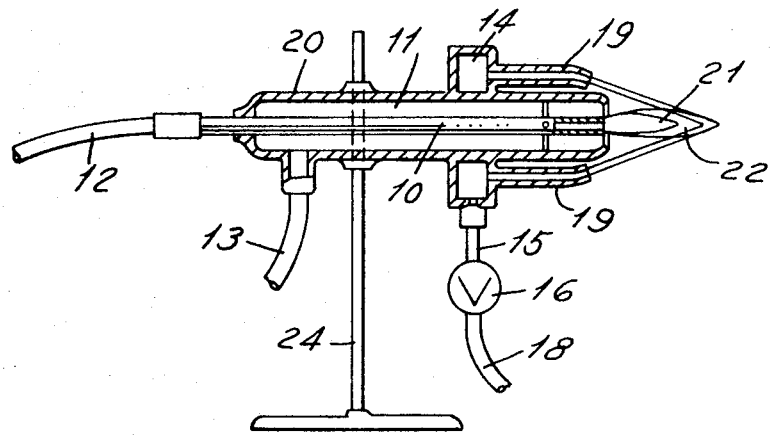
FIG. 1 of the drawing shows a gas-oxygen insulation-removing torch equipped with means for introducing a stream of coolant to the surface of insulation which it is desired to remove from the conductor. This torch is mounted upon a stand and is maintained in a stationary position during use.

In the drawings, the torches consist of a tube defining a passageway 10 for gas and a coaxial barrel 20 defining an annular passageway 11 for oxygen. Gas (not shown) is fed to the passageway 10 through a flexible tube 12. Ordinary city gas is satisfactory for use in the method of this invention although it is obvious that other gases which create a higher temperature flame can also be used. Oxygen (not shown) is introduced to the annular passageway 11 by means of the flexible tube 13.

Figure 2:
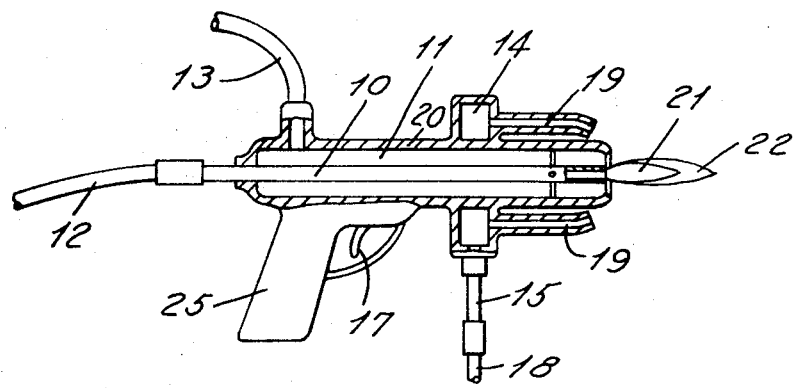
FIG. 2 illustrates a gas-oxygen torch having a pistol grip and trigger controlled means for introducing coolant.

An annular manifold 14 is positioned around the barrel 20 of the torch at the flame end thereof. Coolant (not shown) is introduced to the manifold 14 by the flexible tube 15 under the control of a valve 16 as shown in FIG. 1 or a trigger 17 as shown in FIG. 2. Air serves as a satisfactory cooling medium although other gases which are inert may also be used for this purpose.

Figure 3:
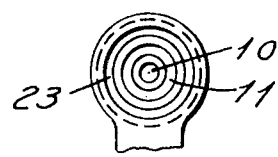
FIG. 3 illustrates an alternative embodiment in which the coolant is introduced through a nozzle having an annular configuration.

In a prefered form of this invention, the coolant includes water particles (not shown) which may be introduced to the coolant stream through a flexible tube 18. A convenient way for the introduction of water is by means of an atomizer (not shown). A plurality of nozzles 19 lead from the annular manifold 14. While only two such nozzles are shown for illustrative purposes, a preferred number of six spaced 60° apart around the barrel 20 of the torch. The nozzles 19 are aimed so as to send a jet of coolant at a point about ½" beyond the cone 21 of flame 22 during operation. In FIG. 3, the coolant is directed from a single annular nozzle 23 rather than the plurality of nozzles 19 of FIGS. 1 and 2.

In FIG. 1, the torch is mounted on a stand 24 and thus remains stationary while the workpiece is moved. The torch of FIG. 2 has a hand grip 25 and thus can be maneuvered with respect to the workpiece which may be held stationary. Both torches are intended for use in factory production. In the case of the embodiment of FIG. 1, the valve 16 may be foot-operated in order to give the operator the use of both hands for positioning workpieces.

Figure 4A:
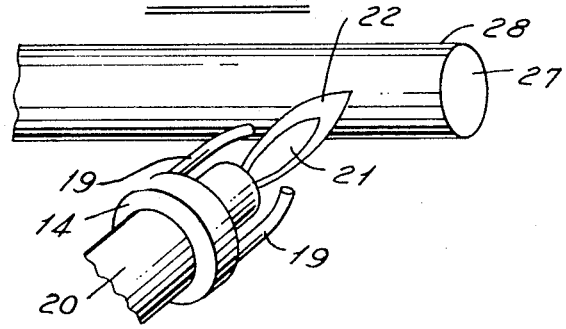
FIGS. 4(a)–(c) illustrate the use of the torches in the removal of insulation.
Figure 4B:
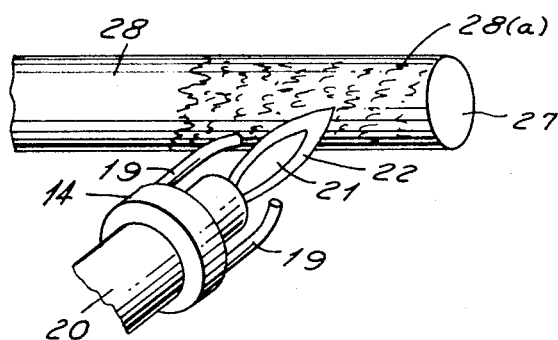
Figure 4C:
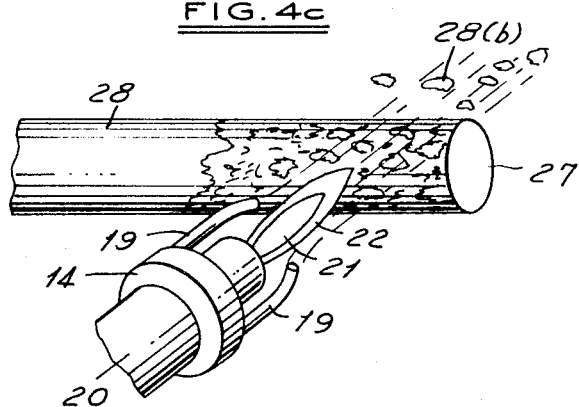

While the torch apparatus of this invention can be used to remove low-temperature insulation such as vinyl acetal or polyester, the torches are designed particularly for use in removing esterimide and similar high-temperature insulation. Referring to FIGS. 4(a)–(c), a wire 27 covered with insulation 28 is positioned in the flame 22 about ½" outside of the cone 21. The wire is heated until the cohesion of the insulation is greatly reduced. This usually takes 3–5 seconds for a single conductor. Two conductors of the same size twisted together may require 6–7 seconds. Twisted groups of four or more conductors will require about 12 seconds or more and the joint should be rotated 180° for uniform heating. The greater the number of wires the more air spaces occur between interfaces thus reducing the thermal conductivity and slowing down the effective heating rate. When the insulation 28(a) is sufficiently degraded as shown in FIG. 4(b), the valve 16 is opened or the trigger 17 pressed to direct a stream of coolant on the degraded insulation. The coolant stream overcomes the remaining forces of cohesion while, at the same time, cooling the insulation sufficiently to prevent charring. The coolant is introduced only long enough to lift off the degraded insulation as shown in FIG. 4(c) at 28(b). On single wires this may take only two seconds but larger groupings require up to ten seconds. The time of coolant application depends on the joint cleanliness required. If air alone is used copper wire will exhibit a slight to medium oxidation. If water vapor is present in the coolant wires will be semi-bright due to the thermal shock and rapid cooling through the oxidation temperature range. Under the attack from the coolant stream the insulation sloughs off leaving bare wire.

While practice is necessary in order to produce wire having a clean surface, an operator can quickly develop the necessary skill. The insulation changes its appearance during the heating step and reaches what can best be described as a "red heat" by the time it is necessary to turn on the coolant blast. The coolant is normally at about room temperature and if it is turned on too soon not all of the insulation will be removed. In this case, it is necessary to stop the flow of coolant and reheat the insulation prior to restarting the flow of coolant.

It was previously mentioned that a preferred embodiment of the invention includes the presence of water particles in the coolant. The underlying conductor is much cleaner after removal of the insulation when water particles are present in the coolant. A possible explanation for this is that water particles strike the heated insulation and conductor and quickly vaporize thereby helping to separate portions of the insulation from each other and from the conductor. This "thermal shock" has the effect of further reducing the cohesive forces within the insulation thereby hastening the separation process.

Considerable care must be taken to avoid heating the wire for too long a period prior to turning on the coolant stream. Once the flame is applied it must be held close and moved slowly to continually raise the temperature to the point where degradation occurs. If the flame is moved too rapidly or the flame to conductor distance is not correct a tenacious char will form.

While the invention has been described with reference to certain preferred embodiments thereof, it is obvious that there may be variations which fall within the proper scope of the invention. Accordingly, it is intended that the invention be limited in scope only as may be necessitated by the scope of the appended claims.

What I claim as new and desire to secure by Letters Patent of the United States is:

1. The method of removing high-temperature enamel insulation from an electrically conductive wire which comprises the sequential steps of heating said high-temperature enamel insulation to be removed with a gas-oxygen torch until said insulation has been degraded to a weakly cohesive state, and blowing said degraded insulation from said wire before substantial charring of said degraded insulation occurs by directing a stream of coolant at said degraded insulation.

2. The method of claim 1 wherein said electrically conductive wire comprises copper and wherein the stream of coolant contains water.

3. The method of claim 1 wherein the coolant is air.

4. The method of removing high-temperature enamel insulation from an electrically conductive wire comprising the sequential steps of heating the high-temperature enamel insulation to be removed to red heat whereupon the heated insulation is degraded to a weakly cohesive state, and blowing the heated insulation from the wire before substantial charring of said heated insulation occurs by directing a stream of coolant at the heated insulation.

5. The method of claim 4 wherein the high-temperature enamel insulation to be removed is heated with a gas-oxygen torch.

6. The method of claim 4 wherein said electrically conductive wire consists essentially of copper, and wherein said heated insulation is blown from said wire by directing a stream of air and water at the heated insulation.

7. The method of removing high-temperature enamel insulation from an electrically conductive wire comprising the steps of heating the high-temperature enamel insulation to be removed to degrade the high-temperature enamel insulation to a weakly cohesive state and thereupon cooling the heated insulation to prevent charring while simultaneously blowing the heated insulation being cooled from the wire by directing a stream of fluid at the heated insulation.

8. The method of claim 7 wherein an air stream is directed at the heated insulation to blow the heated insulation from the conductor.

9. The method of claim 7 wherein said electrically conductive wire comprises copper and wherein a stream of liquid and gaseous fluids is directed at the heated insulation to cool and blow the heated insulation from the conductor.

References Cited

UNITED STATES PATENTS

| | | | |
|---|---|---|---|
| 2,303,280 | 11/1942 | Jenkins | 299—140.1 |
| 2,317,495 | 4/1943 | Thompson et al. | 266—23 H |
| 2,532,567 | 12/1950 | Mott et al. | 266—23 H |
| 2,583,779 | 1/1952 | Jones | 134—19 X |
| 3,182,361 | 5/1965 | Trimble | 22—193 |
| 3,258,207 | 6/1966 | Cody | 239—336 |
| 3,374,117 | 3/1968 | Savage | 134—19 X |

MORRIS O. WOLK, Primary Examiner

T. HAGAN, Assistant Examiner

U.S. Cl. X.R.

134—37, 38; 266—23 H